(12) United States Patent
McCoy et al.

(10) Patent No.: US 6,419,257 B1
(45) Date of Patent: Jul. 16, 2002

(54) ADJUSTABLE LENGTH CAM ARM FOR WEIGHT DISTRIBUTING HITCH ASSEMBLY

(75) Inventors: Richard W. McCoy, Granger; Chad A. McCoige, Mishawaka, both of IN (US)

(73) Assignee: Reese Products, Inc., Elkhart, IN (US)

( * ) Notice: Subject to any disclaimer, the term of this patent is extended or adjusted under 35 U.S.C. 154(b) by 0 days.

(21) Appl. No.: 09/678,558

(22) Filed: Oct. 3, 2000

Related U.S. Application Data

(60) Provisional application No. 60/157,757, filed on Oct. 5, 1999.

(51) Int. Cl.$^7$ .................................................. B60D 1/32
(52) U.S. Cl. .................................. 280/455.1; 280/406.2
(58) Field of Search ........................... 280/405.1, 406.2, 280/406.1, 455.1, 457, 432, 456.1

(56) References Cited

U.S. PATENT DOCUMENTS

| | | |
|---|---|---|
| 2,729,467 A | 1/1956 | Reese |
| 2,817,541 A * | 12/1957 | Mathisen |
| 3,194,584 A | 7/1965 | Reese |
| 3,542,394 A | 11/1970 | Palage |
| 3,552,771 A | 1/1971 | Hendricks |
| 3,600,004 A | 8/1971 | Newkirk |
| 3,633,939 A | 1/1972 | Evernham et al. |
| 3,722,920 A | 3/1973 | Reese |
| 3,730,554 A | 5/1973 | Saunders |
| 3,751,069 A | 8/1973 | Suckow |
| 3,756,618 A * | 9/1973 | Lewis ........................ 280/489 |
| 4,278,267 A | 7/1981 | Vasseur |
| 4,306,734 A | 12/1981 | Swanson et al. |
| 4,312,516 A | 1/1982 | Olsen |
| 4,402,523 A | 9/1983 | Knowles |
| 4,815,752 A * | 3/1989 | Young et al. ............ 280/406.2 |
| 5,375,867 A | 12/1994 | Kass et al. |
| 5,465,991 A | 11/1995 | Kass et al. |
| 5,562,298 A | 10/1996 | Kass et al. |
| 5,868,414 A | 2/1999 | McCoy et al. |
| 6,045,147 A * | 4/2000 | Schmidt et al. .......... 280/406.1 |

\* cited by examiner

*Primary Examiner*—Avraham Lerner
(74) *Attorney, Agent, or Firm*—King & Schickli, PLLC

(57) ABSTRACT

A weight distributing hitch assembly for towing a trailer behind a towing vehicle includes a ball mount head, a pair of spring bars, a pair of adjustable length cam arms for supporting projecting ends of the spring bars, a pair of lift units carried on the trailer and a pair of lift chains extending between the cam arms and the lift units. The projecting ends of the spring bars include a cam follower and the distal ends of the cam arms include cooperating cams that function to provide trailer sway control.

11 Claims, 3 Drawing Sheets

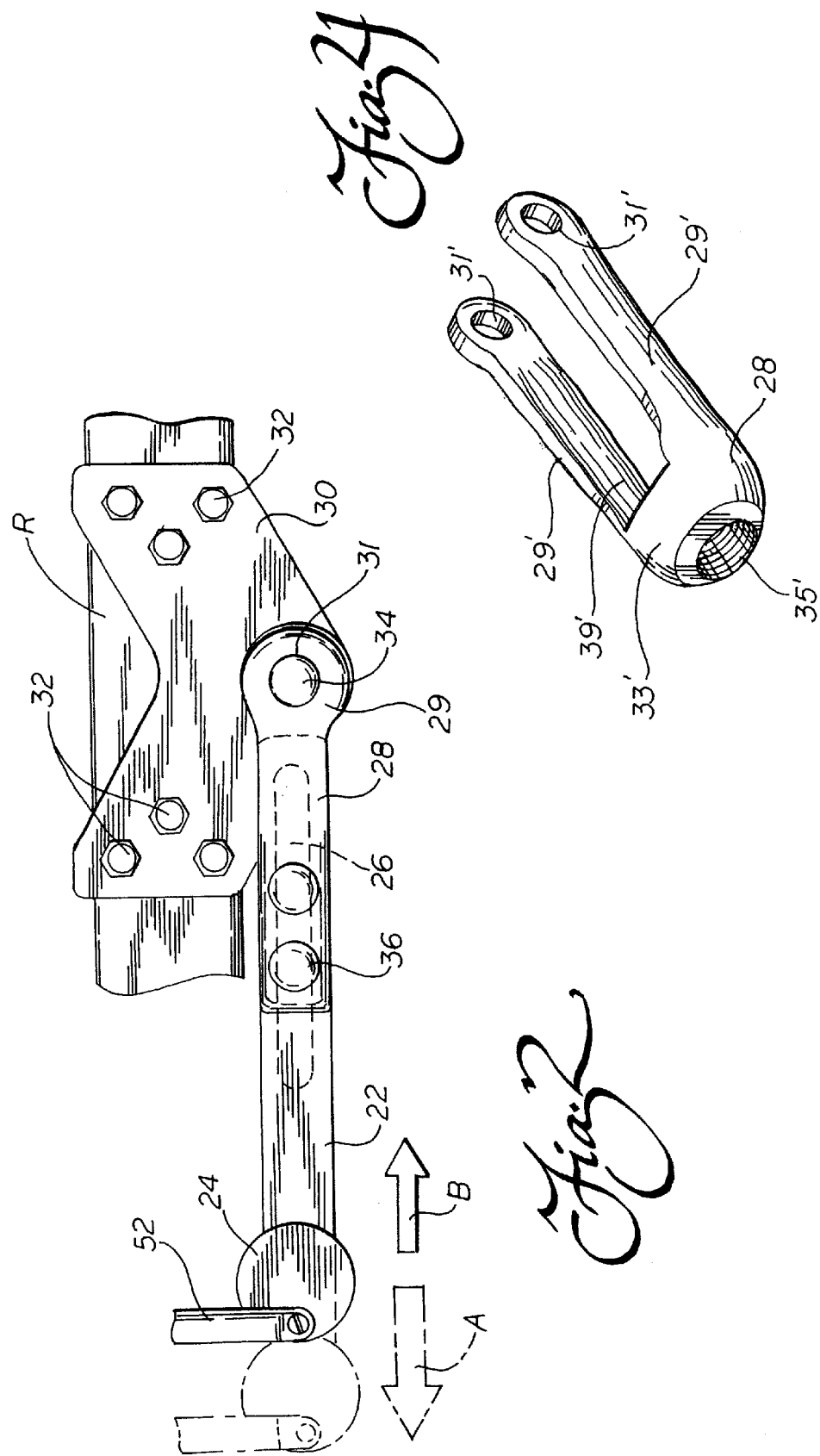

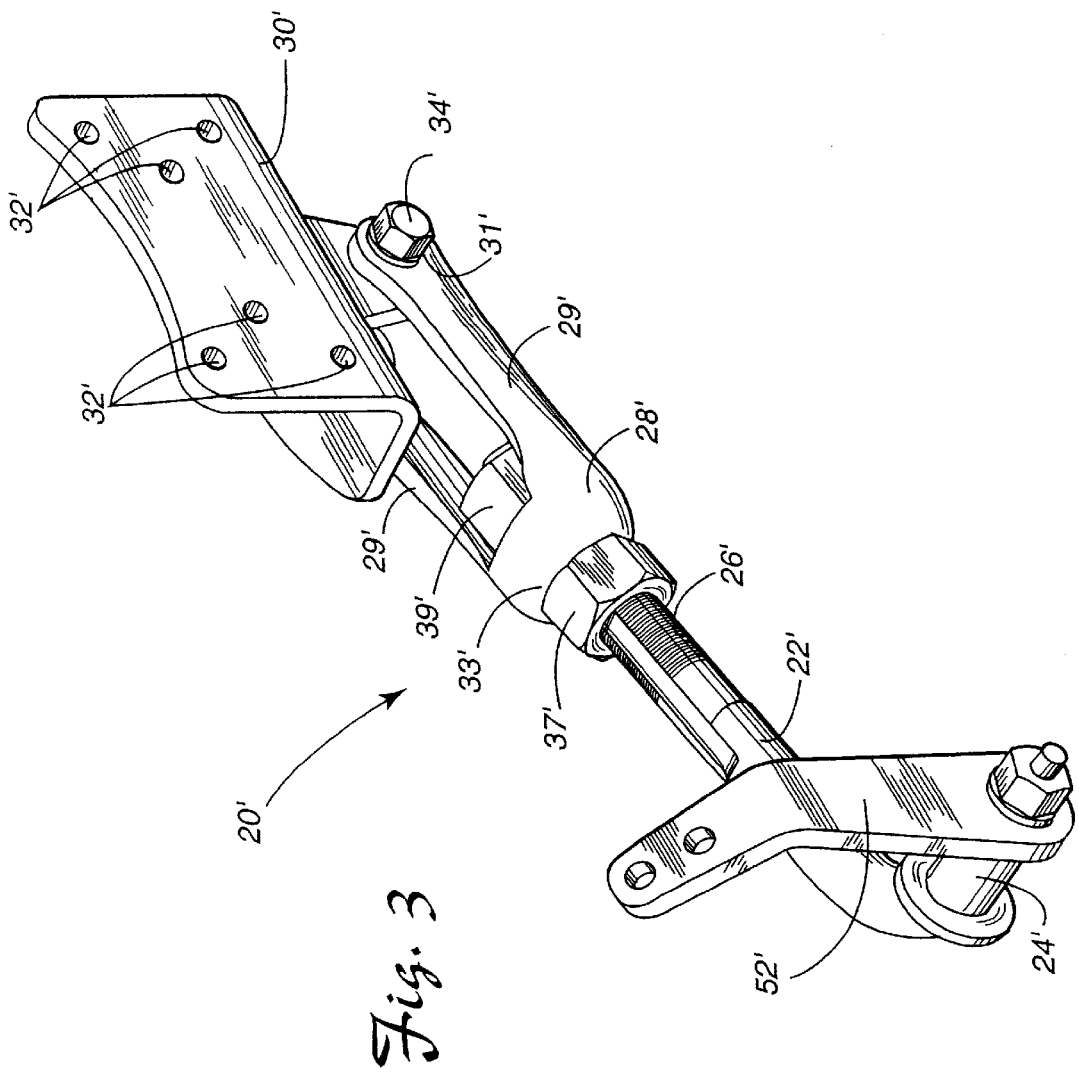

ADJUSTABLE LENGTH CAM ARM FOR WEIGHT DISTRIBUTING HITCH ASSEMBLY

This application claims the benefit of U.S. Provisional Application No. 60/157,757, filed Oct. 5, 1999.

TECHNICAL FIELD

The present invention relates generally to the trailer towing field and, more particularly, to a new and improved weight distributing hitch assembly which also provides trailer sway control.

BACKGROUND OF THE INVENTION

Hitch assemblies for more evenly distributing the tow weight of a trailer over the front and rear wheels of a towing vehicle are well known in the art. Examples of weight distributing hitch assemblies of the type being described may be found in U.S. Pat. Nos. 5,375,867 and 5,465,991 to Kass et al. owned by Reese Products, Inc., the assignee of the present invention. Such hitch assemblies include a hitch bar for mounting in a trailer hitch receiver secured to the towing vehicle and a ball mount head for mounting on the hitch bar at a selected tilt angle. A pair of lift units are secured to the opposing rails of the trailer frame. A pair of spring bars are mounted at their proximal ends to the ball mount head and held by the lift units at their distal ends. In operation, the lift units allow one to adjust the amount of leveling or load transfer provided by the spring bars.

More recently, weight distributing hitch assemblies with integral trailer sway control have been developed. The weight distributing hitch assembly utilized with this prior art sway control system includes a ball mount head and a pair of spring bars. Each spring bar carries a cam follower at its projecting, distal end. The dual cam sway control system consists of a pair of one-piece cam arms, each cam arm having a proximal end pivotally mounted to a bracket secured to one of the frame rails of the trailer and a distal end carrying a cam for receiving the cam follower of a spring bar. Each bracket is secured to a frame rail of the trailer by a pair of U-bolts. These U-bolts allow the selective positioning of the brackets. As a consequence, the position of the cams at the ends of the cam arms may be selectively adjusted to insure proper meeting of the cams with the cam followers of the spring bars so as to provide the desired anti-sway and weight distributing performance.

While such a U-bolt adjustment system generally functions admirably for its intended purpose, in certain applications it has been found that gas bottles, trailer jacks and/or other trailer equipment or accessories may interfere with the U-bolt mounting system. Accordingly, a need exists for an alternative to this approach.

SUMMARY OF THE INVENTION

To achieve the foregoing and other objects, and in accordance with the purposes of the present invention as described herein, an improved weight distributing hitch assembly is provided for towing a trailer behind a vehicle. The weight distributing hitch assembly includes a ball mount head which may be mounted to and carried upon a hitch bar secured in the receiver box of a trailer hitch receiver mounted to a towing vehicle. The weight distributing hitch assembly also includes a pair of spring bars. Each of the pair of spring bars includes a first end secured to the ball mount head and a second projecting end. The weight distributing hitch assembly also includes a pair of adjustable length cam arms. Each of the pair of cam arms has a proximal end mounted to the trailer and a distal end for engaging and supporting the second, projecting end of one of the pair of spring bars. Further, the weight distributing hitch assembly also includes a pair of lift units carried on the trailer and a pair of lift chains. A lift chain extends between each one of the distal ends of the pair of adjustable length cam arms and its corresponding lift unit.

Additionally, the second projecting end of each of the pair of spring bars includes a cam follower and the distal end of each of the pair of adjustable length cam arms includes a cam. The cooperating cam followers and cams function in a manner that provides resistance to trailer sway and thus, trailer sway control of the trailer being towed behind the towing vehicle, In accordance with yet another aspect of the present invention, the first end of each of the pair of spring bars may include a trunnion head that is received to allow relative pivotal movement in the ball mount head. Such a trunnion head is disclosed, for example, in U.S. Pat. No. 5,562,298 to Kass et al., the full disclosure of which is incorporated by reference.

More specifically describing the invention, the weight distributing hitch assembly for towing a trailer behind the towing vehicle includes a ball mount head and a pair of spring bars. Each of the pair of spring bars includes a first end secured to the ball mount head and a second projecting end. The weight distributing hitch assembly also includes a pair of adjustable length cam arms. Each of the pair of adjustable length cam arms includes (a) a first segment having a cam at a first terminus thereof and an elongated slot adjacent a second terminus thereof and (b) a second segment having a head at a proximal end thereof for securing to a mounting bracket by means of a pivot pin and a fastener carried adjacent a distal end thereof for engaging in the elongated slot of the first segment.

Still further, the weight distributing hitch assembly includes a pair of lift units carried on the trailer and a pair of lift chains. One of the lift chains extends between the first terminus of one of the adjustable length cam arms and one of the pair of lift units. The other of the lift chains extends between the first terminus of the other of the adjustable length cam arms and the other of the pair of lift units.

Preferably, the second end of each of the spring bars includes a cam follower that engages the cam on the first terminus of the first segment of one of the pair of adjustable cam arms. Further, the first end of each of said pair of spring bars includes a trunnion head that is received to allow relative pivotal movement in the ball mount head. In addition, each of the pair of lift units includes a mounting bracket, a wishbone lever pivotally mounted to the mounting bracket and a lift chain receiving lug carried on the wishbone lever. Further, the first segment includes a securing loop adjacent the first terminus for engaging one of the pair of lift chains.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 2 is a detailed side elevational view of the adjustable length cam arm illustrating relative length adjustment.

FIG. 3 is a perspective view of an alternative embodiment of the present invention; and FIG. 4 is a detailed perspective view of the second cam arm segment of the alternative embodiment.

Figure 1:
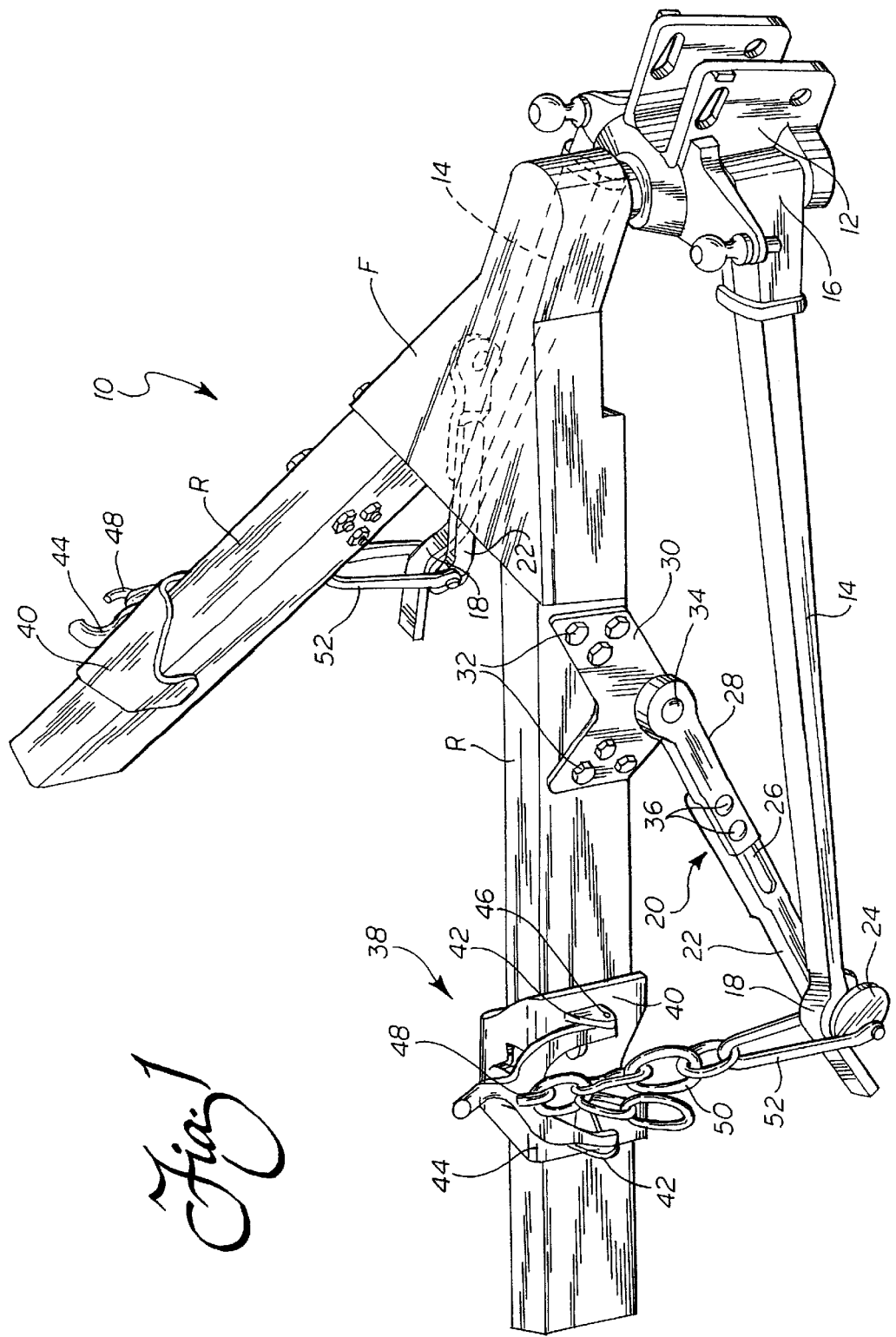
FIG. 1 is a perspective view of the weight distributing hitch assembly of the present invention for towing a trailer behind the towing vehicle.

Reference will now be made in detail to two embodiments of the invention, an example of each being illustrated in the accompanying drawing.

DETAILED DESCRIPTION OF THE INVENTION

Reference is now made to FIG. 1 showing the weight distributing hitch assembly 10 of the present invention. The weight distributing hitch assembly 10 includes a ball mount head 12 that may be secured to a hitch bar (not shown) that is mounted in the receiver box of a trailer hitch receiver (also not shown) that is secured to a towing vehicle. The connections of such a ball mount head 12 to a hitch bar and such a hitch bar to a trailer hitch receiver are well known in the art and shown and described in, for example U.S. Pat. No. 5,562,298 to Kass et al. the full disclosure of which is incorporated herein by reference.

A pair of spring bars 14 provide weight distribution in a manner well known in the art. As shown, each spring bar 14 includes a trunnion head 16 at the first end thereof. The trunnion heads 16 are received in the ball mount head 12 so as to allow relative pivotal movement of the spring bars 14 with the respect to the ball mount head. The second, projecting end of each spring bar 14 includes a cam follower 18. These cam followers 18 may be integrally formed with each spring bar 14.

The weight distributing hitch assembly 10 also includes a pair of adjustable length cam arms generally designated by reference numeral 20. Each adjustable length cam arm 20 incorporates a first segment 22 having a cam 24 at a first terminus thereof and an elongated slot 26 adjacent a second terminus thereof (see also FIG. 2). Additionally, each adjustable length cam arm 20 includes a second segment 28 that is fastened to a mounting bracket 30 secured by bolts or other fasteners 32 to a rail R of the trailer frame F. Each mounting bracket 30 carries a pivot pin 34. The head 29 at the proximal end of the second segment 28 of each adjustable length cam arm 20 includes an aperture 31 that receives one of the pivot pins 34 so as to allow relative pivotal movement of the adjustable length cam arms with respect to the mounting brackets 30. A fastener 36 such as a pair of bolts and cooperating locknuts is carried on each second segment 28 adjacent a distal end thereof. Each fastener 36 engages in the elongated slot 26 of the first segment 22.

It should be appreciated that the relative length of each cam arm 20 may be easily adjusted. Specifically, by loosening the associated fastener 36 (eg. loosening the locknuts on the cooperating bolts), clamping force is released. This release of clamping force in combination with the clearance between the fasteners 36 and the ends of the elongated slot 26 allows relative longitudinal movement of the first segment 22 with respect to the second segment 28. Specifically, by moving the first segment 22 in the direction of action arrow A (see FIG. 2), the length of the cam arm 20 is extended (note phantom line showing). In contrast, by moving the first segment 22 with respect to the second segment 28 in the direction of action arrow B, the length of the cam arm 20 is shortened. Graduations (not shown) may be provided on the segments 22, 28 to aid in accurate length adjustment.

The relative length of the cam arms 20 is adjusted as necessary to properly bring the cams 24 and the cam followers 18 on the spring bars 16 into proper engagement so as to allow optimum performance of the hitch assembly 10 under substantially any foreseeable operating conditions. Advantageously, this allows the mounting brackets 30 to be bolted, welded or otherwise secured to the trailer frame F at any appropriate space having the necessary clearance to accommodate the brackets between, for example, such components as a propane fuel tank, trailer jack or the like while also insuring proper mating of the cams 24 and cam followers 18. This is particularly advantageous when one considers that the positioning of components and accessories of this nature varies sometimes quite significantly from trailer to trailer and manufacturer to manufacturer. Of course, the resulting ease of installation and ease of adjustment characteristic of the present invention in order to insure optimum weight distribution and trailer sway control performance are very significant benefits greatly appreciated by those in the trailer field. Once adjusted to the desired length, the fasteners 36 are tightened to rigidly secure the two segments 22, 28 together and provide a cam arm 20 of constant length.

The hitch assembly 10 also includes a pair of lift units 38. One lift unit 38 is mounted to each rail R of the trailer frame F. Each lift unit 38 includes a mounting bracket 40 that may be welded, bolted or otherwise secured to the trailer frame F. Each mounting bracket 40 includes an integral yoke 42. A wishbone lever 44 is connected to the yoke 42 by means of a pair of pivot pins 46 so that the lever may be pivoted with respect to the mounting bracket 40. As should be appreciated, the wishbone lever 44 also carries a lug 48 for engaging a lift chain 50. The proximal end of the lift chain 50 is secured to the cam 24 of the first segment 22 of the cooperating cam arm 20 by means of the securing loop 52.

The length of the lift chain 50 is adjusted in a manner well known in the art to effect the desired load leveling or weight distribution. Specifically, the wishbone lever 44 is released by pivoting toward the viewer in FIG. 1. A selected link of lift chain 50 is then placed over the lug 46. The wishbone lever 44 is then pivoted over center to the position shown in drawing FIG. 1 to effect the desired weight distribution through the spring bar 14. Of course, as is known in the art, an identical adjustment of the lift unit 38 and lift chain 50 is also made on the opposite side of the trailer frame F to effect weight distribution through the other spring bar 14, cam arm 20, lift unit 38 and lift chain 50.

Advantageously, the present invention not only provides the desired weight distribution through the cooperative effort of the spring bars 14, cam arms 20, lift units 38 and lift chains 48, but also very effective anti-sway control through the cooperative effort of the cam followers 18 at the second ends of the springs bars 14 and the cams 24 carried by the adjustable length cam arms 20. Specifically, if the trailer being towed begins to sway, the cam followers 18 must ride up on the cams 24. The cam followers 18 at each side of the trailer are shaped to resist this motion and thus, dampen or control trailer sway. Optimum performance of the hitch assembly 10 may be insured by adjusting the relative length of the cam arms 20 in the manner previously described. Accordingly, it should be appreciated that the present invention provides not only weight distribution, but also anti-sway control in a single trailer hitch assembly 10.

FIG. 3 is a perspective view of an alternative embodiment of the adjustable length cam arm 20' of the present invention. The cam arm 20' includes a first segment 22' having a cam 24' at a first terminus thereof and a threaded portion 26' at a second, opposite terminus. Additionally, each adjustable length cam arm 20' includes a second segment 28' that is fastened to a mounting bracket 30' secured by bolts 32' or other appropriate fasteners to a rail R of a trailer frame F in the manner described above for the first embodiment 20.

The second segment 28' is substantially U-shaped so as to include two lugs 29' at a proximal end. Each lug 29' includes an aperture 31' for receiving and engaging a pivot pin 34' carried by the bracket 30'. The pivot pin 34' allows relative pivotal movement of the adjustable length cam arm 20' with respect to the mounting bracket 30'. A fastener such as a nut (not shown) threadedly engages the pivot pin 34' so as to hold the lugs between the nut and the bolt head and complete the connection between the bracket 30' and the lugs 29' of the second segment 28'.

The distal end of the second segment 28' includes a tail portion 33' including an aperture 35' that is received over the threaded portion 26' of the first segment 22'. First and second nuts 37', 39' threadedly engage the threaded portion 26' of the first segment 22' on each side of the head portion 33' and are tightened together to sandwich the head portion and thereby secure the first and second segments 22', 28' relative to one another.

The relative length of the cam arm 20' may be easily adjusted by loosening one of the nuts 37' or 39', sliding the telescoping first and second segments 22' and 28' relative to one another and then retightening the other of the two nuts 37' or 39' into the new position. Thus, the adjustable length cam arm 20' may be shortened by loosening the nut 37'the desired shortening distance. Next is the sliding of the second segment 28' over the first segment 22' until the tail 33' again engages the nut 37'. While holding the two segments 22' and 28' together with the tail 33'butting against the nut 37', the nut 39' is tightened into engagement with the tail to again tightly sandwich the tail between the two nuts. The adjustable length cam arm 20' is then set in a shorter length.

In order to lengthen the cam arm 20', the nut 39' is backed away from the tail 33' along the threaded portion 26' the desired length. The two segments 22' and 28' are then shifted in order to move the tail 33' into engagement with the nut 39' at its new position. The nut 37' is then tightened into engagement with the tail 33' in order to sandwich the tail between the two nuts 37', 39' in the new, longer position.

The length of the cam arm 20' is adjusted for the same reasons noted above with respect to the first embodiment 20 so as to provide the most efficient and effective setup for trailer towing while avoiding any clearance difficulties that might be presented by the trailer frame and associated accessories. Of course, it should be appreciated that in the alternative embodiment 20', the lug 52' replaces the securing loop 52' of the first embodiment. Thus, the lug 52' engages a lift chair (not shown) which is secured to the trailer by means of a lift unit of the type shown at 38' in FIG. 1.

The foregoing description of tow possible embodiments of the invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A weight distributing hitch assembly for towing a trailer behind a towing vehicle, comprising:
   a ball mount head;
   a pair of spring bars, each of said pair of spring bars including a first end secured to said ball mount head and a second, projecting end;
   a pair of adjustable length cam arms having proximal ends for mounting to the trailer and distal ends for engaging and supporting said second, projecting ends of said pair of spring bars;
   a pair of lift units for carrying on said trailer; and
   a pair of lift chains extending between said distal ends of said pair of adjustable length cam arms and said pair of lift units.

2. The weight distributing hitch assembly of claim 1, wherein said second, projecting end of each of said pair of spring bars includes a cam follower and said distal end of each of said pair of adjustable length cam arms includes a cam.

3. The weight distributing hitch assembly of claim 2, wherein said first end of each of said pair of spring bars includes a trunnion head that is received to allow relative pivotal movement in said ball mount head.

4. A weight distributing hitch assembly for towing a trailer behind a towing vehicle, comprising:
   a ball mount head;
   a pair of spring bars, each of said pair of spring bars including a first end secured to said ball mount head and a second, projecting end;
   a pair of adjustable length cam arms, each of said pair of adjustable length cam arms including (a) a first segment having a cam at a first terminus thereof and an elongated slot adjacent a second terminus thereof and (b) a second segment having a head at a proximal end thereof and a fastener carried adjacent a distal end thereof for engaging in said elongated slot adjacent said second terminus of said first segment;
   a mounting bracket and a pivot pin for pivotally securing said head of said second segment to said mounting bracket;
   a pair of lift units for carrying on said trailer; and
   a pair of lift chains extending between and connecting said first termini of said pair of adjustable length cam arms and said pair of lift units.

5. The weight distributing hitch assembly of claim 4, wherein said second, projecting ends of said pair of spring bars include cam followers that engage said cams on said first termini of said first segments of said pair of adjustable length cam arms.

6. The weight distributing hitch assembly of claim 5, wherein said first ends of said pair of spring bars include trunnion heads that are received to allow relative pivotal movement in said ball mount head.

7. The weight distributing hitch assembly of claim 6, wherein said pair of lift units include mounting brackets, wishbone levers pivotally mounted to said mounting brackets and lift chain receiving lugs carried on said wishbone levers.

8. The weight distributing hitch assembly of claim 7, wherein said first segments include securing loops adjacent said first termini for engaging said pair of lift chains.

9. A weight distributing hitch assembly for towing a trailer behind a towing vehicle, comprising:

a ball mount head;

a pair of spring bars, each of said pair of spring bars including a first end secured to said ball mount head and a second, projecting end;

a pair of adjustable length cam arms, each of said cam arms including (a) a first segment having a cam at a first terminus thereof and a threaded portion along a second terminus thereof and (b) a second segment having at least one lug at a proximal end thereof and a tail including an aperture at a distal end thereof for receiving said threaded portion of said first segment;

a fastener for securing said first and second segments together;

a mounting bracket and a pivot pin for pivotally securing said lug of said second segment to said mounting bracket;

a pair of lift units for carrying on said trailer; and a pair of lift chains extending between and connecting said first terminus of said adjustable length cam arms and said pair of lift units.

10. The weight distributing hitch assembly of claim 9, wherein said second segment is substantially U-shaped.

11. The weight distributing hitch assembly of claim 9, wherein said fastener comprises a pair of nuts which threadedly engage said threaded position of said first segment to secure said first and second segments together.

* * * * *